(12) United States Patent
Davis, Jr. et al.

(10) Patent No.: US 9,803,561 B2
(45) Date of Patent: Oct. 31, 2017

(54) POWER OUTPUT AND EMISSIONS BASED DEGRADED GAS TURBINE TUNING AND CONTROL SYSTEMS, COMPUTER PROGRAM PRODUCTS AND RELATED METHODS

(71) Applicant: General Electric Company, Schenectady, NY (US)

(72) Inventors: Lewis Berkley Davis, Jr., Niskayuna, NY (US); Scott Arthur Day, Greenville, SC (US); Harold Lamar Jordan, Jr., Greenville, SC (US); Rex Allen Morgan, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 486 days.

(21) Appl. No.: 14/546,498

(22) Filed: Nov. 18, 2014

(65) Prior Publication Data

US 2016/0138481 A1     May 19, 2016

(51) Int. Cl.
*F02C 9/28* (2006.01)
(52) U.S. Cl.
CPC ........ *F02C 9/28* (2013.01); *F05D 2270/0831* (2013.01)
(58) Field of Classification Search
CPC ...... F02C 3/04; F02C 6/00; F02C 6/02; F02C 9/00; F02C 9/26; F02C 9/28; F02C 9/32; F02C 9/42; F02C 9/48; F02C 9/56; F23N 2041/20; F23N 2900/05006; F01D 21/003; F01D 21/12; F01D 21/14; F05D 2260/821; F05D 2270/05; F05D 2270/053;

(Continued)

(56) References Cited

U.S. PATENT DOCUMENTS

| 4,528,839 A | 7/1985 | Blanchard et al. |
| 5,319,931 A | 6/1994 | Beebe et al. |

(Continued)

FOREIGN PATENT DOCUMENTS

| EP | 1 808 589 A2 | 7/2007 |
| GB | 2520985 A | 10/2015 |
| JP | 2013-194688 A | 9/2013 |

OTHER PUBLICATIONS

U.S. Appl. No. 14/686,126, filed Apr. 14, 2015, Morgan et al.

(Continued)

*Primary Examiner* — Ehud Gartenberg
*Assistant Examiner* — Jason H Duger
(74) *Attorney, Agent, or Firm* — Ernest G. Cusick; Hoffman Warnick LLC

(57) ABSTRACT

Various embodiments include a system having: at least one computing device configured to tune a set of gas turbines (GTs) by performing actions including: commanding each GT in the set of GTs to a base load level, based upon a measured ambient condition for each GT; commanding each GT in the set of GTs to adjust a respective output to match a nominal mega-watt power output value, and subsequently measuring an actual emissions value for each GT; adjusting an operating condition of each GT in the set of GTs based upon a difference between the respective measured actual emissions value and a nominal emissions value at the ambient condition; and calculating a degradation for each GT in the set of GTs over a period.

20 Claims, 9 Drawing Sheets

(58) Field of Classification Search
CPC ....... F05D 2270/0831; F05D 2270/093; F05D 2270/1024; F05D 2270/11; F05D 2270/112; F05D 2270/13; F05D 2270/20; F05D 2270/311; F05D 2270/312; F05D 2270/313; F05D 2270/335; F05D 2270/44
See application file for complete search history.

(56) References Cited

U.S. PATENT DOCUMENTS

| | | | |
|---|---|---|---|
| 5,357,741 | A | 10/1994 | Talabisco et al. |
| 5,410,883 | A | 5/1995 | Nigawara et al. |
| 5,447,059 | A | 9/1995 | Miller et al. |
| 5,487,266 | A | 1/1996 | Brown |
| 5,734,658 | A | 3/1998 | Rall et al. |
| 6,314,735 | B1 | 11/2001 | Kolmanovsky et al. |
| 6,539,783 | B1 * | 4/2003 | Adibhatla ............... F02C 9/00 73/112.06 |
| 6,564,109 | B1 * | 5/2003 | Ashby ............... G05B 23/0294 700/304 |
| 6,618,690 | B1 | 9/2003 | Syrjärinne |
| 6,715,277 | B2 | 4/2004 | Zagranski et al. |
| 6,823,675 | B2 | 11/2004 | Brunell et al. |
| 6,871,160 | B2 | 3/2005 | Jaw |
| 6,912,856 | B2 | 7/2005 | Morgan et al. |
| 6,952,640 | B2 | 10/2005 | Bleile et al. |
| 7,021,062 | B2 | 4/2006 | Tanaka et al. |
| 7,100,357 | B2 | 9/2006 | Morgan et al. |
| 7,188,019 | B2 | 3/2007 | Nomura et al. |
| 7,197,430 | B2 | 3/2007 | Jacques et al. |
| 7,203,554 | B2 | 4/2007 | Fuller |
| 7,216,699 | B2 | 5/2007 | Nelson et al. |
| 7,219,040 | B2 | 5/2007 | Renou et al. |
| 7,269,939 | B2 | 9/2007 | Kothnur et al. |
| 7,451,601 | B2 | 11/2008 | Taware et al. |
| 7,513,100 | B2 | 4/2009 | Motter et al. |
| 7,620,461 | B2 | 11/2009 | Frederick, II et al. |
| 7,654,092 | B2 | 2/2010 | Ryan et al. |
| 7,742,904 | B2 | 6/2010 | Healy et al. |
| 7,743,599 | B2 | 6/2010 | Taware et al. |
| 7,822,512 | B2 | 10/2010 | Thatcher et al. |
| 7,840,332 | B2 | 11/2010 | Saravanapriyan et al. |
| 7,853,392 | B2 | 12/2010 | Healey et al. |
| 8,090,545 | B2 | 1/2012 | Gobrecht et al. |
| 8,127,557 | B2 | 3/2012 | Dinu |
| 8,245,493 | B2 | 8/2012 | Minto |
| 8,370,044 | B2 | 2/2013 | Dean et al. |
| 8,434,291 | B2 | 5/2013 | Kraemer et al. |
| 8,452,515 | B2 * | 5/2013 | Drohan ............... F01D 17/08 700/286 |
| 8,474,268 | B2 | 7/2013 | Fuller et al. |
| 8,650,009 | B2 | 2/2014 | Forbes et al. |
| 9,127,597 | B2 | 9/2015 | Masiello et al. |
| 9,334,750 | B2 | 5/2016 | Liebau et al. |
| 9,422,866 | B2 | 8/2016 | Zhang |
| 9,605,559 | B2 | 3/2017 | Truesdale et al. |
| 2004/0073400 | A1 | 4/2004 | Tomita et al. |
| 2005/0107941 | A1 | 5/2005 | Healy |
| 2007/0074516 | A1 | 4/2007 | Peck et al. |
| 2008/0140352 | A1 | 6/2008 | Goebel et al. |
| 2008/0243352 | A1 | 10/2008 | Healy |
| 2009/0048730 | A1 | 2/2009 | Akkaram et al. |
| 2009/0158734 | A1 | 6/2009 | West et al. |
| 2009/0326890 | A1 * | 12/2009 | Shetty ............... G05B 17/02 703/7 |
| 2010/0286889 | A1 | 11/2010 | Childers |
| 2011/0210555 | A1 | 9/2011 | Xia et al. |
| 2012/0070266 | A1 | 3/2012 | Schaberg et al. |
| 2012/0072194 | A1 | 3/2012 | Arnold et al. |
| 2012/0283885 | A1 * | 11/2012 | Mannar ............... G05B 23/024 700/286 |
| 2013/0006429 | A1 | 1/2013 | Shanmugam et al. |
| 2013/0024179 | A1 * | 1/2013 | Mazzaro ............... G06Q 10/04 703/18 |
| 2013/0036744 | A1 | 2/2013 | Emberger et al. |
| 2013/0152587 | A1 | 6/2013 | Jordan, Jr. et al. |
| 2013/0158731 | A1 | 6/2013 | Chandler |
| 2014/0156165 | A1 | 6/2014 | Ewens et al. |
| 2014/0244055 | A1 * | 8/2014 | Rosson ............... G06F 1/26 700/287 |
| 2014/0257666 | A1 | 9/2014 | Abrol et al. |
| 2014/0260312 | A1 | 9/2014 | Davis, Jr. et al. |
| 2015/0160051 | A1 | 6/2015 | D'Mello |
| 2015/0234951 | A1 | 8/2015 | Andersson et al. |
| 2016/0138470 | A1 | 5/2016 | Davis, Jr. et al. |

OTHER PUBLICATIONS

U.S. Appl. No. 14/546,491, filed Nov. 18, 2014, Davis et al.
U.S. Appl. No. 14/546,504, filed Nov. 18, 2014, Davis et al.
U.S. Appl. No. 14/546,512, filed Nov. 18, 2014, Davis et al.
U.S. Appl. No. 14/546,520, filed Nov. 18, 2014, Davis et al.
U.S. Appl. No. 14/686,136, filed Apr. 14, 2015, Morgan et al.
U.S. Appl. No. 14/686,145, filed Apr. 14, 2015, Morgan et al.
U.S. Appl. No. 14/686,151, filed Apr. 14, 2015, Morgan et al.
U.S. Appl. No. 14/686,157, filed Apr. 14, 2015, Morgan et al.
U.S. Appl. No. 14/686,164, filed Apr. 14, 2015, Morgan et al.
U.S. Appl. No. 14/686,171, filed Apr. 14, 2015, Morgan et al.
U.S. Appl. No. 14/686,183, filed Apr. 14, 2015, Morgan et al.
U.S. Appl. No. 14/686,193, filed Apr. 14, 2015, Morgan et al.
U.S. Appl. No. 14/686,201, filed Apr. 14, 2015, Morgan et al.
U.S. Appl. No. 14/546,525, filed Nov. 18, 2014, Davis et al.
U.S. Appl. No. 13/801,259, filed Mar. 13, 2013, Davis et al.
U.S. Appl. No. 13/937,078, filed Jul. 8, 2013, Morgan et al.
U.S. Appl. No. 13/937,078, filed Jul. 8, 2013.
U.S. Appl. No. 14/686,157, Office Action 1 dated Sep. 9, 2016, 32 pages.
U.S. Appl. No. 14/686,126, Office Action 1 dated Sep. 12, 2016, 31 pages.
U.S. Appl. No. 14/686,151, Office Action 1 dated Sep. 13, 2016, 32 pages.
U.S. Appl. No. 14/686,164, Office Action 1 dated Sep. 13, 2016, 34 pages.
U.S. Appl. No. 14/686,201, Office Action 1 dated Sep. 13, 2016, 33 pages.
U.S. Appl. No. 14/686,136, Office Action 1 dated Sep. 23, 2016, 34 pages.
U.S. Appl. No. 14/686,145, Office Action 1 dated Sep. 23, 2016, 34 pages.
U.S. Appl. No. 141686,171, Office Action 1 dated Sep. 23, 2016, 34 pages.
U.S. Appl. No. 14/686,183, Office Action 1 dated Sep. 23, 2016, 34 pages.
U.S. Appl. No. 13/937,078, Office Action 1 dated Dec. 14, 2015, 10 pages.
European Search Report and Written Opinion Issued in Connection with Corresponding EP Application No. 14196449.4-1862 dated Mar. 6, 2015, 6 pages.
Saul, "Subsea Instrumentation Interface Standardization in the Offshore Oil and Gas Industry," IEEE International Conference on Communications, ICC , pp. 08-13-08-18, Jun. 11, 2006, 6 pages.
GB Search Report dated Jun. 3, 2014 issued in Connection with GB Patent Application No. 1321555.3 filed on Dec. 6, 2013, 3 pages.
Non-Final Rejection towards U.S. Appl. No. 13/801,259 dated Nov. 5, 2015.
Notice of Allowance towards U.S. Appl. No. 13/937,078 dated Jun. 27, 2016.
Extended European Search Report and Opinion issued in connection with related EP Application No. 16164179.0 dated Sep. 14, 2016.
Extended European Search Report and Opinion issued in connection with related EP Application No. 16164177.4 dated Sep. 14, 2016.
U.S. Appl. No. 14/546,491, Notice of Allowance dated Jun. 20, 2017, 276172-1 (Geen-0582-US), 37 pages.
U.S. Appl. No. 14/546,525, Notice of Allowance dated Jun. 22, 2017, 277317-1 (Geen-0591-US), 36 pages.

(56) References Cited

OTHER PUBLICATIONS

U.S. Appl. No. 14/546,504, Notice of Allowance dated Jun. 30, 2017, 276701-1 (Geen-0584-US), 31 pages.
U.S. Appl. No. 14/546,512, Notice of Allowance dated Jul. 12, 2017, 276802-1 (Geen-0586-US), 36 pages.
U.S. Appl. No. 14/606,548, Office Action 1 dated Aug. 2, 2017, 265518-1 (Geen-0614-US), 34 pages.
U.S. Appl. No. 14/546,520, Notice of Allowance dated Aug. 7, 2017, 276809-1 (Geen-0587-US), 37 pages.

* cited by examiner

POWER OUTPUT AND EMISSIONS BASED DEGRADED GAS TURBINE TUNING AND CONTROL SYSTEMS, COMPUTER PROGRAM PRODUCTS AND RELATED METHODS

CROSS-REFERENCE TO RELATED APPLICATIONS

This application relates to U.S. patent application Ser. No. 14/546,491, U.S. patent application Ser. No. 14/546,504, U.S. patent application Ser. No. 14/546,512, U.S. patent application Ser. No. 14/546,520, and U.S. patent application Ser. No. 14/546,525 all filed concurrently herewith on Nov. 18, 2014.

FIELD OF THE INVENTION

The subject matter disclosed herein relates to tuning and control systems. More particularly, the subject matter disclosed herein relates to tuning and control systems for degraded gas turbines.

BACKGROUND OF THE INVENTION

At least some known gas turbine engines include controllers that monitor and control their operation. Known controllers govern the combustion system of the gas turbine engine and other operational aspects of the gas turbine engine using operating parameters of the engine. At least some known controllers receive operating parameters that indicate the gas turbine engine's present operating state, define operational boundaries by way of physics-based models or transfer functions, and apply the operating parameters to the operational boundary models. Additionally, at least some known controllers also apply the operating parameters to scheduling algorithms, determine error terms, and control boundaries by adjusting one or more gas turbine engine control effectors. However, at least some operating parameters may be unmeasured parameters, such as parameters that may be impractical to measure using sensors. Some of such parameters include firing temperature (i.e., stage 1 turbine vane exit temperature), combustor exit temperature, and/or turbine stage 1 nozzle inlet temperature.

At least some known gas turbine engine control systems indirectly control or monitor unmeasured operating parameters using measured parameters, such as compressor inlet pressure and temperature, compressor exit pressure and temperature, turbine exhaust pressure and temperature, fuel flow and temperature, ambient conditions, and/or generator power. However, there is uncertainty in the values of indirect parameters, and the associated gas turbine engines may need tuning to reduce combustion dynamics and emissions. Because of the uncertainty of unmeasured parameters, design margins are used for gas turbine engines that include such known control systems. Using such design margins may reduce the performance of the gas turbine engine at many operating conditions in an effort to protect against and accommodate worst-case operational boundaries. Moreover, many of such known control systems may not accurately estimate firing temperature or exhaust temperature of the gas turbine engine, which may result in a less efficient engine and variation from machine-to-machine in facilities with more than one gas turbine engine.

It has proven difficult to reduce variation in firing temperature from machine-to-machine for industrial gas turbines. For example, firing temperature is a function of many different variables, including variations in the components of the gas turbine and their assembly. These variations are due to necessary tolerances in manufacturing, installation, and assembly of the gas turbine parts. In addition, the controls and sensors used to measure the operating parameters of the gas turbine contain a certain amount of uncertainty in their measurements. It is the uncertainty in the measurement system used to sense the values of the measured operating parameters and the machine component variations that necessarily result in variation of the unmeasured operating parameters of the gas turbine engine, such as the firing temperature. The combination of these inherent inaccuracies makes it difficult to achieve the design firing temperature of a gas turbine engine at a known set of ambient conditions and results in firing temperature variation from machine-to-machine.

BRIEF DESCRIPTION OF THE INVENTION

Various embodiments include a system having: at least one computing device configured to tune a set of gas turbines (GTs) by performing actions including: commanding each GT in the set of GTs to a base load level, based upon a measured ambient condition for each GT; commanding each GT in the set of GTs to adjust a respective output to match a nominal mega-watt power output value, and subsequently measuring an actual emissions value for each GT; adjusting an operating condition of each GT in the set of GTs based upon a difference between the respective measured actual emissions value and a nominal emissions value at the ambient condition; and calculating a degradation for each GT in the set of GTs over a period.

A first aspect includes a system having: at least one computing device configured to tune a set of gas turbines (GTs) by performing actions including: commanding each GT in the set of GTs to a base load level, based upon a measured ambient condition for each GT; commanding each GT in the set of GTs to adjust a respective output to match a nominal mega-watt power output value, and subsequently measuring an actual emissions value for each GT; adjusting an operating condition of each GT in the set of GTs based upon a difference between the respective measured actual emissions value and a nominal emissions value at the ambient condition; and calculating a degradation for each GT in the set of GTs over a period.

A second aspect includes a computer program product having program code, which when executed by at least one computing device, causes the at least one computing device to tune a set of gas turbines (GTs) by performing actions including: commanding each GT in the set of GTs to a base load level, based upon a measured ambient condition for each GT; commanding each GT in the set of GTs to adjust a respective output to match a nominal mega-watt power output value, and subsequently measuring an actual emissions value for each GT; adjusting an operating condition of each GT in the set of GTs based upon a difference between the respective measured actual emissions value and a nominal emissions value at the ambient condition; and calculating a degradation for each GT in the set of GTs over a period.

A third aspect includes a computer-implemented method of tuning a set of gas turbines (GTs), performed using at least one computing device, the method including: commanding each GT in the set of GTs to a base load level, based upon a measured ambient condition for each GT; commanding each GT in the set of GTs to adjust a respective output to match a nominal mega-watt power output value, and subsequently measuring an actual emissions value for each GT;

adjusting an operating condition of each GT in the set of GTs based upon a difference between the respective measured actual emissions value and a nominal emissions value at the ambient condition; and calculating a degradation for each GT in the set of GTs over a period.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
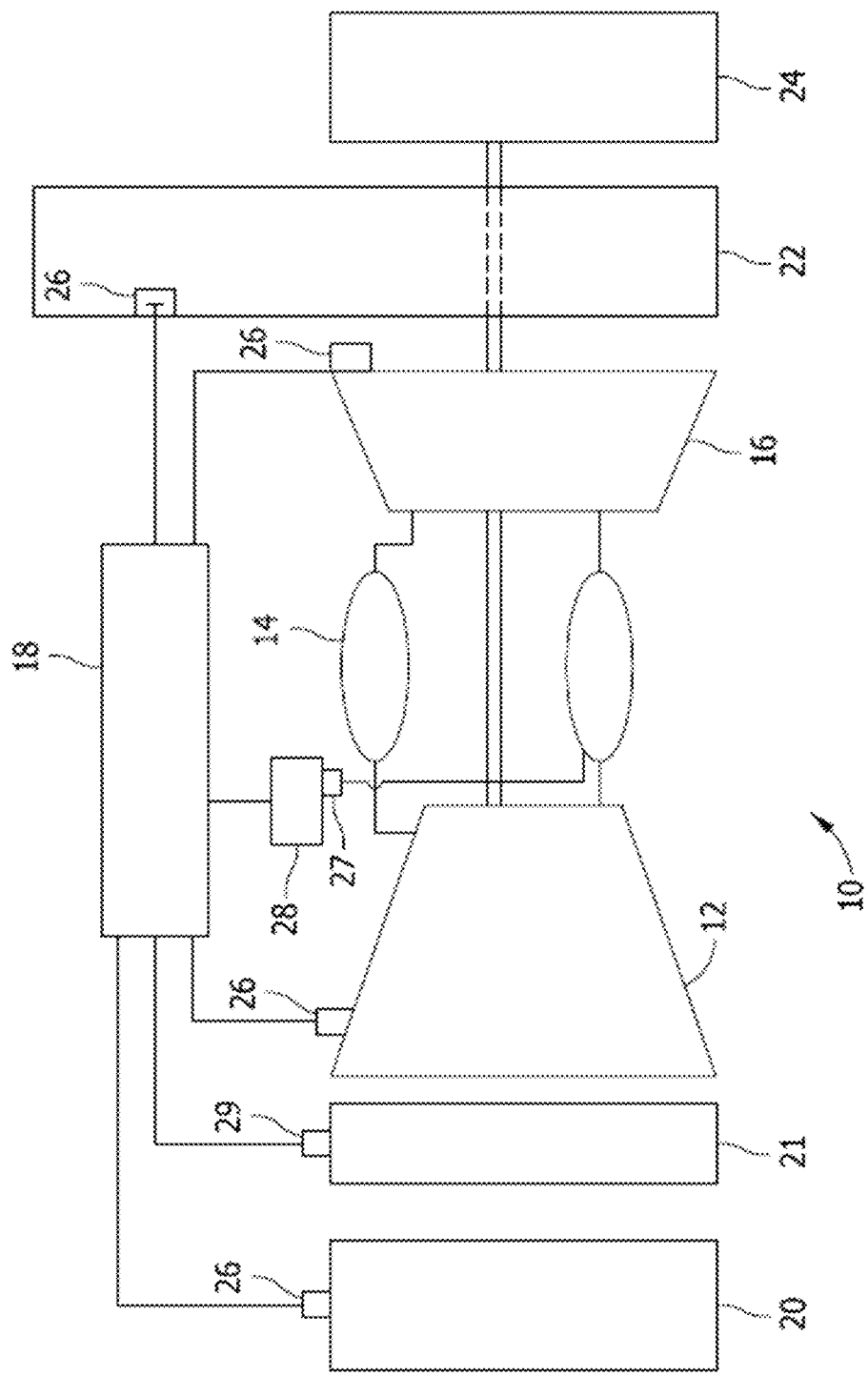
FIG. 1 shows a schematic illustration of a gas turbine engine (GT), including a control system, according to various embodiments of the invention.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, subject matter disclosed herein relates to tuning and control systems. More particularly, the subject matter disclosed herein relates to tuning and control systems for degraded gas turbines.

Probabilistic control is a methodology for setting the operating state of a gas turbine (GT) based upon measured output (in mega-watts, MW) and mono-nitrogen oxides NO and $NO_2$ (nitric oxide and nitrogen dioxide), collectively referred to as $NO_x$ emissions. As described herein, various embodiments provide tuning and control of a GT where errors in $NO_x$ measurements exist. Conventional approaches exist to calculate and tune control mechanisms where measurement errors (output measurements in MW) exist, but no conventional approaches are designed to account for and tune GT control functions in view of $NO_x$ measurements.

As used herein, term P50 GT or P50 machine refers to a mean (or, nominal) gas turbine or similar machine in a fleet. Parameters associated with this P50 measure are considered ideal, and are rarely if ever attained in an actual gas turbine. Other terms used herein can include: a) firing temperature (T4), which is the average temperature downstream of a first-stage nozzle, but upstream of the first rotating bucket in the turbine (e.g., GT); and b) T3.9, which is the combustion temperature in the gas turbine, and is higher than the firing temperature. The firing temperature, as is known in the art, cannot be measured, but is inferred from other measurements and known parameters. As used herein, the term, "indicated firing temperature" refers to the firing temperature as indicated by one or more components of control equipment, e.g., a control system monitoring and/or controlling GT components. The "indicated" firing temperature represents the best estimate of the firing temperature from conventional sensing/testing equipment connected with the GT control system.

Additionally, as described herein, the term "base load" for a particular gas turbine can refer to the maximum output of the gas turbine at rated firing temperature. Further, as described herein, and known in the art, base load for a given gas turbine will change based upon changes in ambient operating conditions. Sometimes base load is referred to as "Full Speed Full Load" in the art. Further, it is understood that NOx is sensitive to fuel composition, and as such, it is accounted for in any tuning processes conducted in a gas turbine (including tuning processes described herein).

According to various embodiments, an approach can include the following processes:

1) Commanding one or more gas turbines (e.g., in a fleet) to a designed base load (MW value, $NO_x$ value), based upon a measured ambient condition. As described herein, in an ideal situation, the GT(s) should, in an ideal scenario, converge to P50 (nominal) operating parameters, including a P50 MW (nominal output) value and P50 $NO_x$ (emissions) value. However, as indicated herein, this does not occur in real-world operations;

2) Commanding the one or more GTs to adjust its output to match to P50 MW (nominal output) value, and measuring the actual NOx value. As noted herein, this process will likely help to bring each GT's actual NOx value closer to the P50 $NO_x$ value, but does not fully succeed in that goal. Additionally, this output adjustment does not address another concern, that being the elevated firing temperature relative to its desired level; and 3) Adjusting each GT's operating condition based upon its difference (Delta $NO_x$) between the measured actual NOx value (process 2) and the expected, P50 $NO_x$ value for the ambient condition. The Delta $NO_x$ value can be translated to a Delta MW value (representing the difference between the GT's actual output and the P50 MW level) for each GT using conventional approaches. In this process, each GT that deviates from the P50 MW value, has its operating condition adjusted by a fixed fraction of the Delta MW value (as converted from the Delta $NO_x$ value) such that it approaches and then reaches the Delta MW value for that GT. This adjustment will move each GT onto a line in MW/$NO_x$ space that is orthogonal to the P50 MW/P50 $NO_x$ characteristic for that GT. The above-noted general processes are described in further detail herein.

In the following description, reference is made to the accompanying drawings that form a part thereof, and in which is shown by way of illustration specific example embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely illustrative.

FIG. 1 shows a schematic illustration of a gas turbine engine (GT) 10 including a control system 18, according to various embodiments. In various embodiments, gas turbine engine 10 includes a compressor 12, a combustor 14, a turbine 16 drivingly coupled to compressor 12, and a computer control system, or controller 18. An inlet duct 20 to compressor 12 channels ambient air and, in some instances, injected water to compressor 12. Duct 20 may include ducts, filters, screens, or sound absorbing devices that contribute to a pressure loss of ambient air flowing through inlet duct 20 and into inlet guide vanes (IGV) 21 of compressor 12. Combustion gasses from gas turbine engine 10 are directed through exhaust duct 22. Exhaust duct 22 may include sound adsorbing materials and emission control devices that induce a backpressure to gas turbine engine 10. An amount of inlet pressure losses and backpressure may vary over time due to the addition of components to inlet duct 20 and exhaust duct 22, and/or as a result of dust or dirt clogging inlet duct 20 and exhaust duct 22, respectively. In various embodiments, gas turbine engine 10 drives a generator 24 that produces electrical power.

Various embodiments are described which measure, analyze and/or control a set of GTs, which may include one or more gas turbine engines (GTs), e.g., in a fleet. It is understood that these approaches are similarly applied to a single GT as two or more GTs. It is further understood that the term "set" as used herein can mean 1 or more.

In various embodiments, a plurality of control sensors 26 detect various operating conditions of gas turbine engine 10, generator 24, and/or the ambient environment during operation of gas turbine engine 10. In many instances, multiple redundant control sensors 26 may measure the same operating condition. For example, groups of redundant temperature control sensors 26 may monitor ambient temperature, compressor discharge temperature, turbine exhaust gas temperature, and/or other operating temperatures the gas stream (not shown) through gas turbine engine 10. Similarly, groups of other redundant pressure control sensors 26 may monitor ambient pressure, static and dynamic pressure levels at compressor 12, turbine 16 exhaust, and/or other parameters in gas turbine engine 10. Control sensors 26 may include, without limitation, flow sensors, speed sensors, flame detector sensors, valve position sensors, guide vane angle sensors, and/or any other device that may be used to sense various operating parameters during operation of gas turbine engine 10.

As used herein, the term "parameter" refers to characteristics that can be used to define the operating conditions of gas turbine engine 10, such as temperatures, pressures, and/or gas flows at defined locations within gas turbine engine 10. Some parameters are measured, i.e., are sensed and are directly known, while other parameters are calculated by a model and are thus estimated and indirectly known. Some parameters may be initially input by a user to controller 18. The measured, estimated, or user input parameters represent a given operating state of gas turbine engine 10.

A fuel control system 28 regulates an amount of fuel flow from a fuel supply (not shown) to combustor 14, an amount split between primary and secondary fuel nozzles (not shown), and an amount mixed with secondary air flowing into combustor 14. Fuel control system 28 may also select a type of fuel for use in combustor 14. Fuel control system 28 may be a separate unit or may be a component of controller 18.

Controller (control system) 18 may be a computer system that includes at least one processor (not shown) and at least one memory device (not shown) that executes operations to control the operation of gas turbine engine 10 based at least partially on control sensor 26 inputs and on instructions from human operators. The controller may include, for example, a model of gas turbine engine 10. Operations executed by controller 18 may include sensing or modeling operating parameters, modeling operational boundaries, applying operational boundary models, or applying scheduling algorithms that control operation of gas turbine engine 10, such as by regulating a fuel flow to combustor 14. Controller 18 compares operating parameters of gas turbine engine 10 to operational boundary models, or scheduling algorithms used by gas turbine engine 10 to generate control outputs, such as, without limitation, a firing temperature. Commands generated by controller 18 may cause a fuel actuator 27 on gas turbine engine 10 to selectively regulate fuel flow, fuel splits, and/or a type of fuel channeled between the fuel supply and combustors 14. Other commands may be generated to cause actuators 29 to adjust a relative position of IGVs 21, adjust inlet bleed heat, or activate other control settings on gas turbine engine 10.

Operating parameters generally indicate the operating conditions of gas turbine engine 10, such as temperatures, pressures, and gas flows, at defined locations in gas turbine engine 10 and at given operating states. Some operating parameters are measured, i.e., sensed and are directly known, while other operating parameters are estimated by a model and are indirectly known. Operating parameters that are estimated or modeled, may also be referred to as estimated operating parameters, and may include for example, without limitation, firing temperature and/or exhaust temperature. Operational boundary models may be defined by one or more physical boundaries of gas turbine engine 10, and thus may be representative of optimal conditions of gas turbine engine 10 at each boundary. Further, operational boundary models may be independent of any other boundaries or operating conditions. Scheduling algorithms may be used to determine settings for the turbine control actuators 27, 29 to cause gas turbine engine 10 to operate within predetermined limits. Typically, scheduling algorithms protect against worst-case scenarios and have built-in assumptions based on certain operating states. Boundary control is a process by which a controller, such as controller 18, is able to adjust turbine control actuators 27, 29 to cause gas turbine engine 10 to operate at a preferred state.

Figure 2:
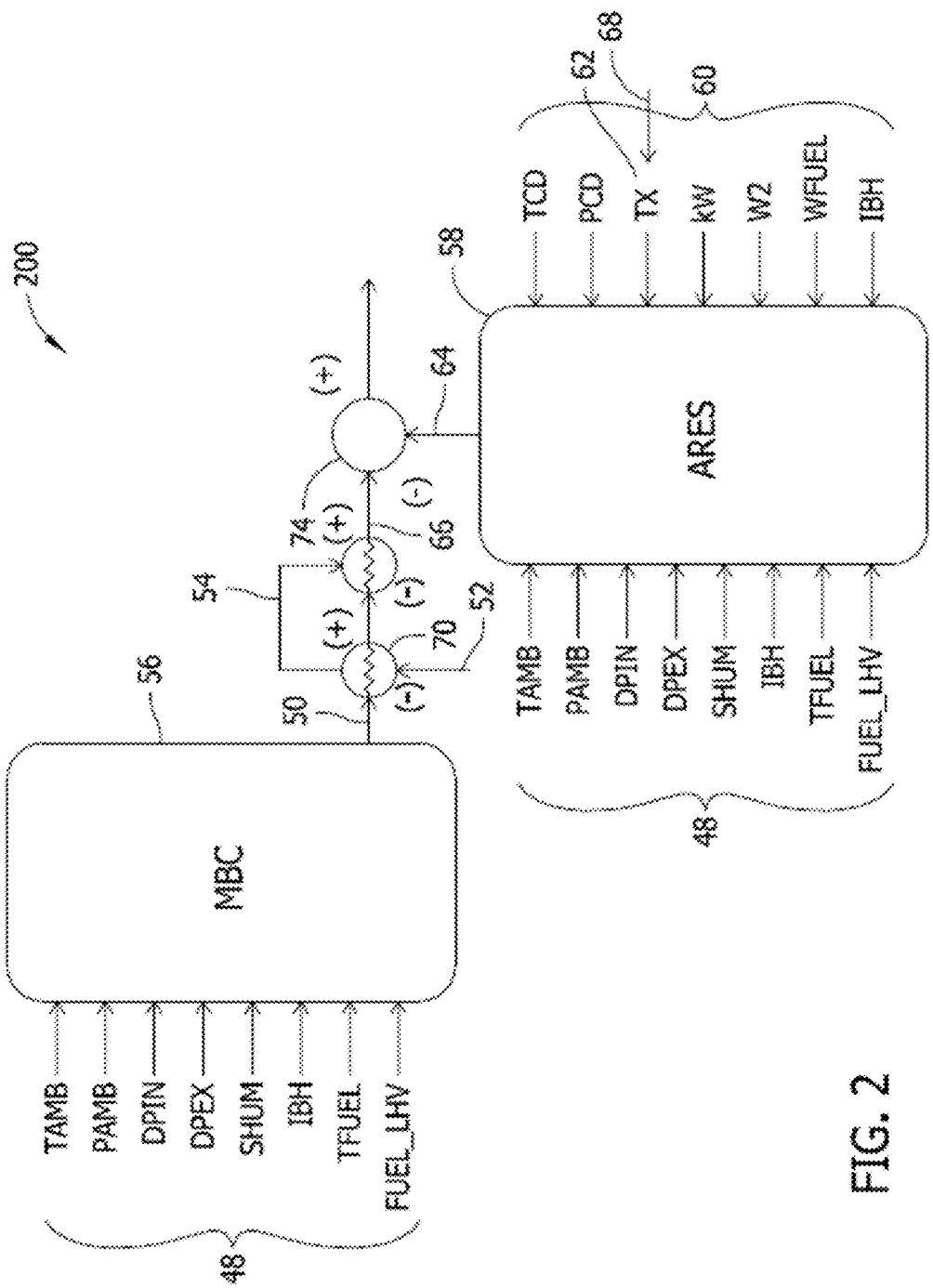
FIG. 2 shows a schematic view of a control architecture that may be used with the control system of FIG. 1 to control operation of the GT, according to various embodiments of the invention.

FIG. 2 shows a schematic view of an example control architecture 200 that may be used with controller 18 (shown in FIG. 1) to control operation of gas turbine engine 10 (shown in FIG. 1). More specifically, in various embodiments, control architecture 200 is implemented in controller 18 and includes a model-based control (MBC) module 56. MBC module 56 is a robust, high fidelity, physics-based model of gas turbine engine 10. MBC module 56 receives measured conditions as input operating parameters 48. Such parameters 48 may include, without limitation, ambient pressure and temperature, fuel flows and temperature, inlet bleed heat, and/or generator power losses. MBC module 56 applies input operating parameters 48 to the gas turbine model to determine a nominal firing temperature 50 (or nominal operating state 428). MBC module 56 may be implemented in any platform that enables operation of control architecture 200 and gas turbine engine 10 as described herein.

Further, in various embodiments, control architecture 200 includes an adaptive real-time engine simulation (ARES) module 58 that estimates certain operating parameters of gas turbine engine 10. For example, in one embodiment, ARES module 58 estimates operational parameters that are not directly sensed such as those generated by control sensors 26 for use in control algorithms. ARES module 58 also estimates operational parameters that are measured such that the estimated and measured conditions can be compared. The comparison is used to automatically tune ARES module 58 without disrupting operation of gas turbine engine 10.

ARES module 58 receives input operating parameters 48 such as, without limitation, ambient pressure and temperature, compressor inlet guide vane position, fuel flow, inlet bleed heat flow, generator power losses, inlet and exhaust duct pressure losses, and/or compressor inlet temperature. ARES module 58 then generates estimated operating parameters 60, such as, without limitation, exhaust gas temperature 62, compressor discharge pressure, and/or compressor discharge temperature. In various embodiments, ARES module 58 uses estimated operating parameters 60 in combination with input operating parameters 48 as inputs to the gas turbine model to generate outputs, such as, for example, a calculated firing temperature 64.

In various embodiments, controller 18 receives as an input, a calculated firing temperature 52. Controller 18 uses a comparator 70 to compare calculated firing temperature 52 to nominal firing temperature 50 to generate a correction factor 54. Correction factor 54 is used to adjust nominal firing temperature 50 in MBC module 56 to generate a corrected firing temperature 66. Controller 18 uses a comparator 74 to compare the control outputs from ARES module 58 and the control outputs from MBC module 56 to generate a difference value. This difference value is then input into a Kalman filter gain matrix (not shown) to generate normalized correction factors that are supplied to controller 18 for use in continually tuning the control model of ARES module 58 thus facilitating enhanced control of gas turbine engine 10. In an alternative embodiment, controller 18 receives as an input exhaust temperature correction factor 68. Exhaust temperature correction factor 68 may be used to adjust exhaust temperature 62 in ARES module 58.

Figure 3:
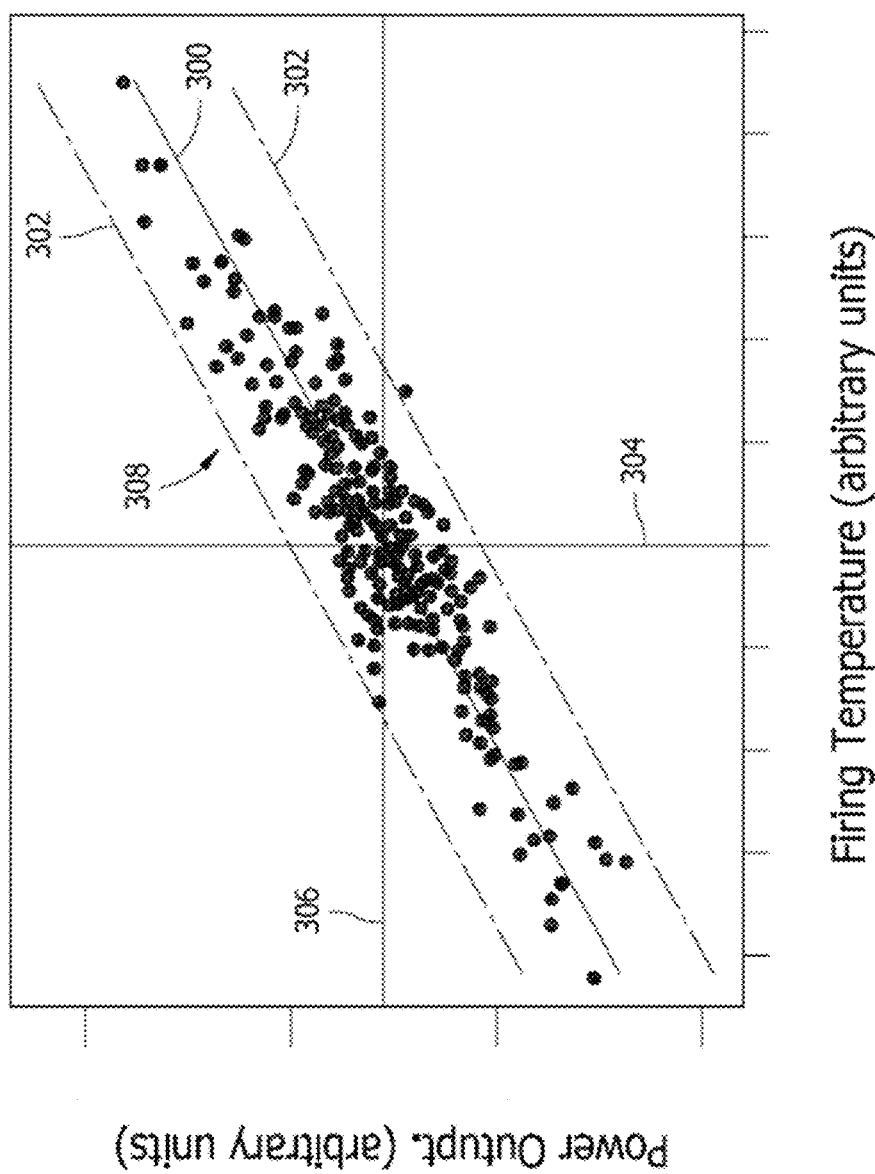
FIG. 3 shows a graphical depiction of a probabilistic simulation of the operating states of a statistically significant number of GT engines of FIG. 1 using a model of the GT used by the control system of FIG. 1.

FIG. 3 is a graph that shows a probabilistic simulation of the operating states of a statistically significant number of the gas turbine engine 10 of FIG. 1 using the model of gas turbine engine used by controller 18. The graph represents power output versus firing temperature of gas turbine engine 10. Line 300 is the linear regression model for the plurality of data points 308. Lines 302 represent the 99% prediction interval corresponding to data points 308. Further, line 304 represents the nominal or design firing temperature 50 for gas turbine engine 10, and line 306 represents a nominal or design power output for gas turbine engine 10. In various embodiments, the probabilistic simulation shown in FIG. 2 shows an approximate variance in firing temperature of 80 units. This variance may be attributed to the component tolerances of gas turbine engine 10, and the measurement uncertainty of controller 18 and control sensors 26.

Described herein are approaches for tuning gas turbine engine 10 that facilitates reducing variation in the actual gas turbine engine 10 operating state, e.g., firing temperature and/or exhaust temperature, which facilitates reducing variation in power output, emissions, and life of gas turbine engine 10. The probabilistic control approaches described herein may be implemented as either a discrete process to tune gas turbine engine 10 during installation and at various periods, or may be implemented within controller 18 to run periodically at a predetermined interval and/or continuously during operation of gas turbine engine 10. These approaches do not measure gas turbine firing temperature directly because firing temperature is an estimated parameter, as previously discussed. These probabilistic control approaches, however, can yield directly measured parameters that are strong indicators of the firing temperature of the gas turbine engine 10, and allow for improved control over the firing temperature in a gas turbine engine 10.

Figure 4:
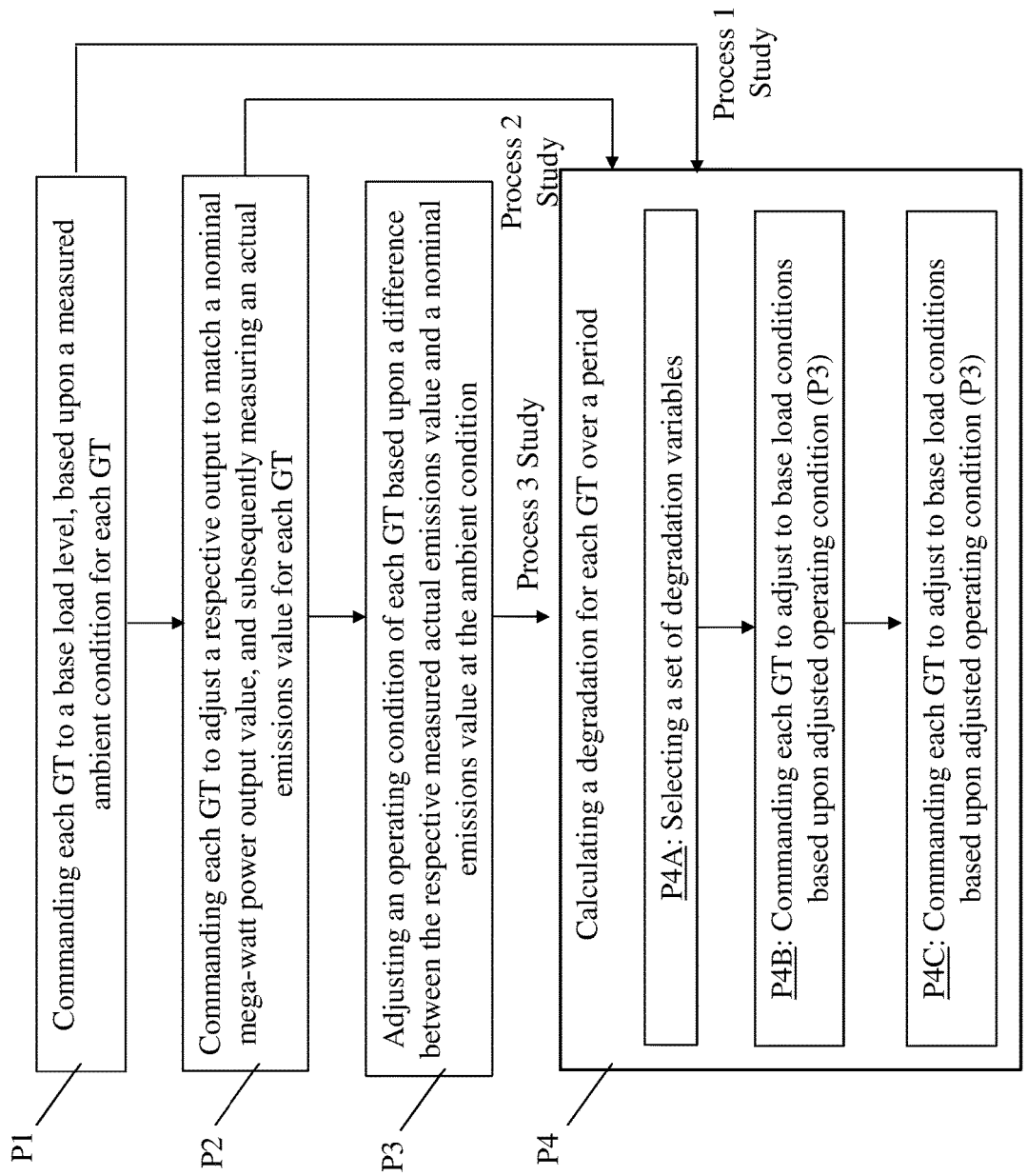
FIG. 4 shows a flow diagram illustrating a method according to various embodiments of the invention.

FIG. 4 shows a flow diagram illustrating a method performed according to various embodiments. As described herein, the method can be performed (e.g., executed) using at least one computing device, implemented as a computer program product (e.g., a non-transitory computer program product), or otherwise include the following processes:

Process P1: commanding each GT 10 in the set of GTs to a base load level (e.g., target indicated firing temperature), based upon a measured ambient condition for each GT 10. As noted herein, the base load (with a target indicated firing temperature) is associated with a mega-watt power output value and an emissions value for the measured ambient condition. As further noted herein, in response to commanding each GT 10 in the set of GTs to the base load level, each GT 10 does not attain at least one of the nominal MW output value (P50 MW) or the nominal emissions value (P50 $NO_x$). According to various embodiments, the process of commanding each GT 10 in the set of GTs to adjust a respective output to match the nominal MW output value moves an actual emissions value for each GT 10 closer to the nominal emissions value without matching the nominal emissions value;

Process P2: commanding each GT 10 in the set of GTs to adjust a respective output to match a nominal mega-watt power output value, and subsequently measuring an actual emissions value for each GT 10. In various embodiments, process P2 can further include converting the difference between the respective measured actual emissions value and the nominal emissions value for each GT 10 into a difference between a respective mega-watt power output value and the nominal mega-watt power output value at the ambient condition value for each GT 10; and Process P3: adjusting an operating condition of each GT 10 in the set of GTs based upon a difference between the respective measured actual emissions value and a nominal emissions value at the ambient condition. According to various embodiments, the process of adjusting the operating condition of each GT 10 includes adjusting the operating condition of each GT 10 in the set of GTs by a fixed fraction of the difference between the respective mega-watt power output value and the nominal mega-watt power output value, such that the output of each GT 10 approaches and then reaches a respective nominal mega-watt power output value. According to various embodiments, adjusting of the operating condition of each GT 10 in the set of GTs by the fixed fraction of the difference between the respective mega-watt power output value and the nominal mega-watt power output value aligns each GT 10 on a line in graphical space plotting mega-watts versus emissions that is orthogonal to a nominal mega-watt power output/nominal emissions characteristic for each GT 10.

Figure 5:
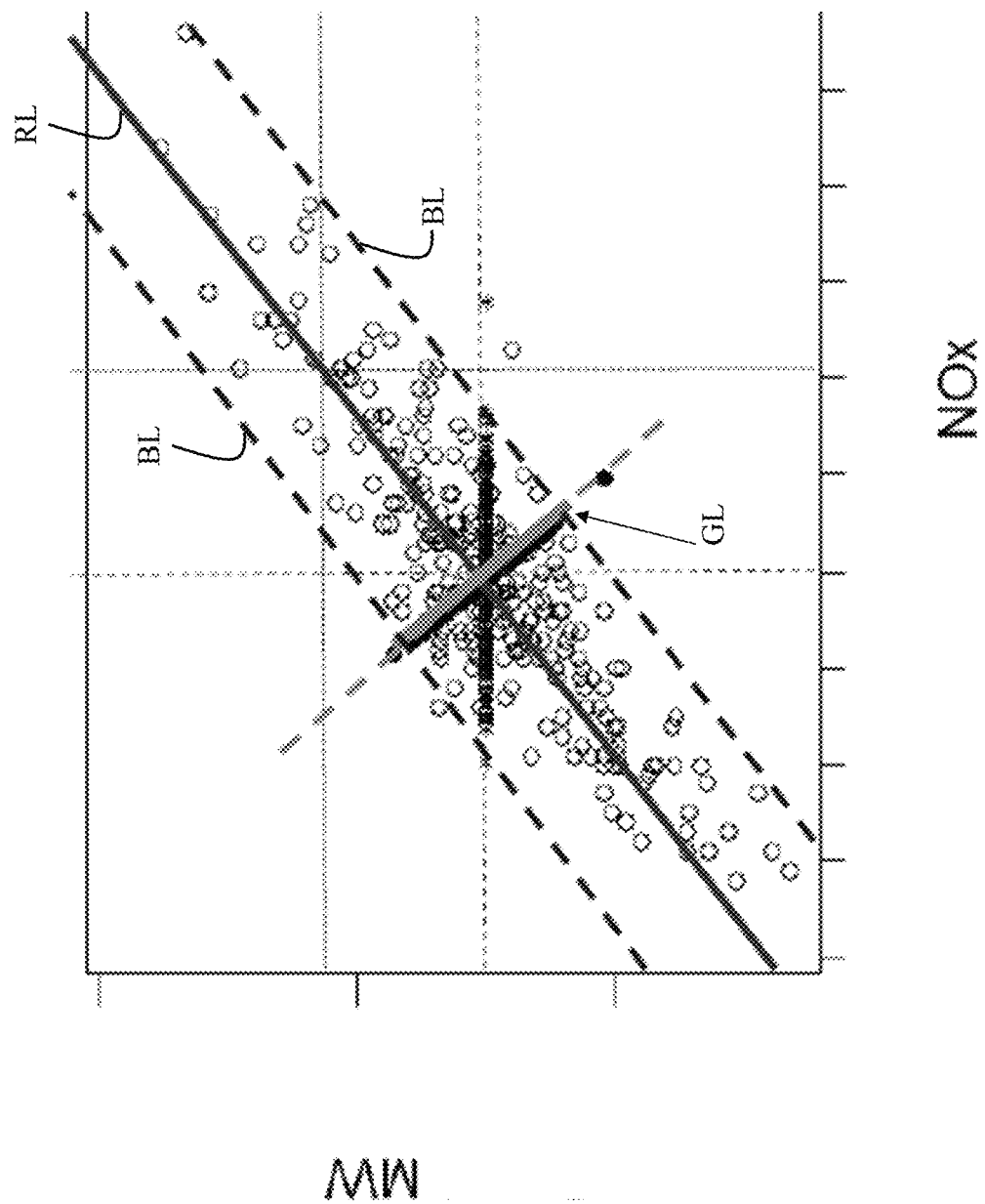
FIG. 5 shows a graphical depiction of a process illustrated in the flow diagram of FIG. 4, in a two-dimensional Mega-Watt-power v. Emissions ($NO_x$) graph.
Figure 6:
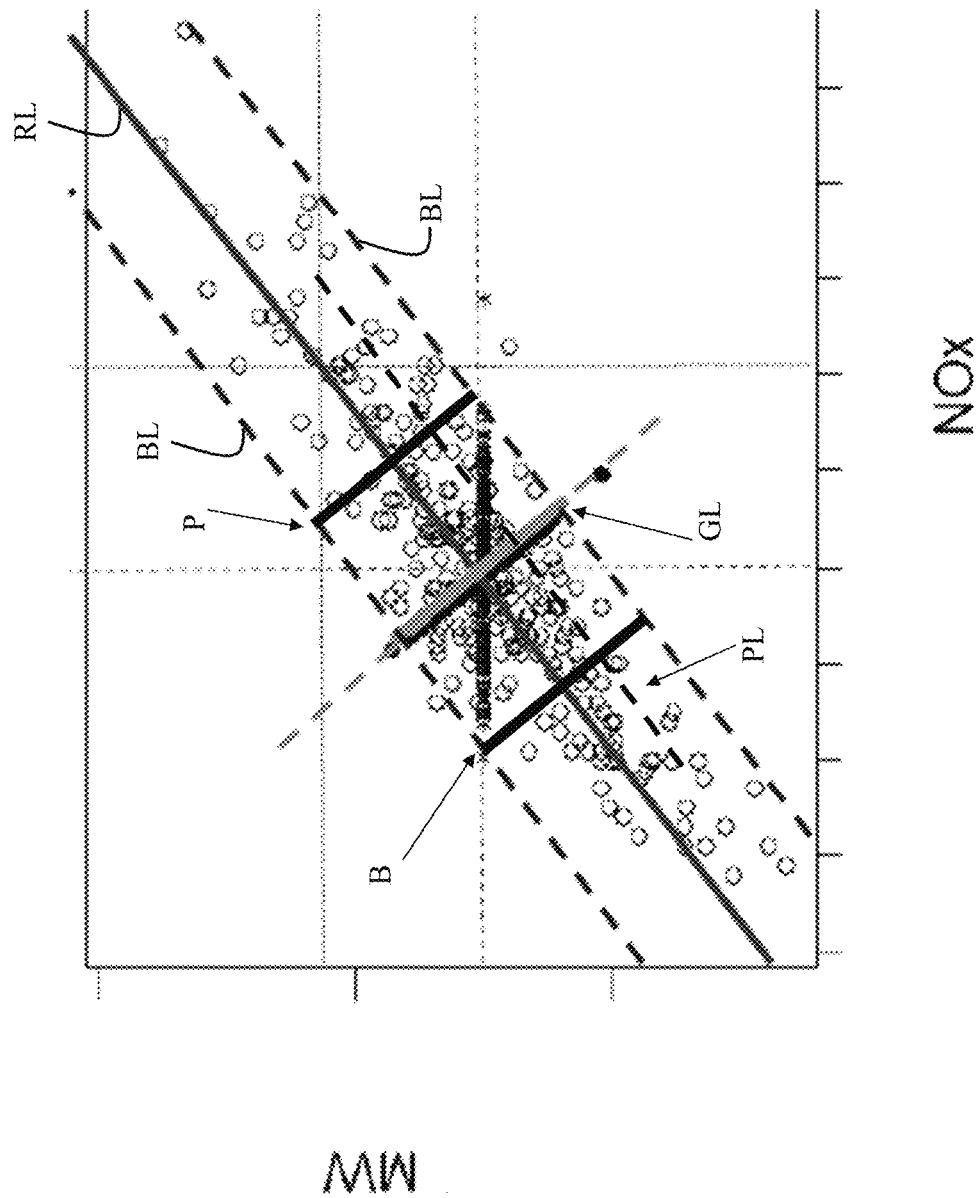
FIG. 6 shows a graphical depiction of a process illustrated in the flow diagram of FIG. 4, in a two-dimensional Mega-Watt-power v. Emissions ($NO_x$) graph.
Figure 7:
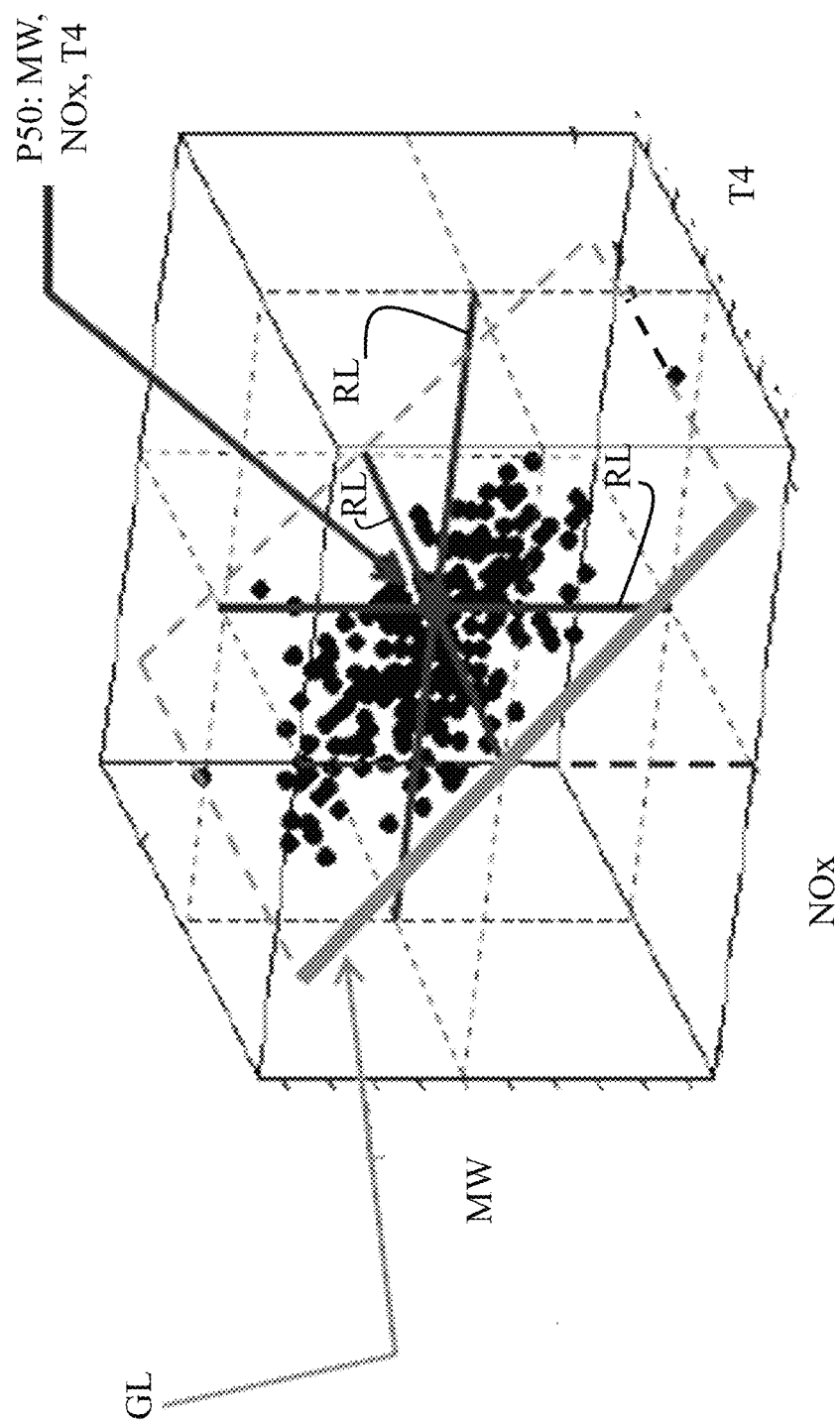
FIG. 7 shows a graphical depiction of a process illustrated in the flow diagram of FIG. 4, in a three-dimensional Mega-Watt-power v. Emissions ($NO_x$) v. firing temperature (T4) graph.

FIGS. 5-7 show graphical depictions, via MW-power v. Emissions ($NO_x$) graphs, of the processes described in FIG. 4, with respect to an example data set representing a set (plurality) of GTs (similar to GT 10). All data points shown in FIGS. 5-6 represent MW-power v. Emissions ($NO_x$) at indicated firing temperatures, where "indicated" firing temperature is the firing temperature as displayed or otherwise outputted by the controller of GT 10. That is, the "indicated" firing temperature is not necessarily the actual firing temperature (which, as described herein, cannot be accurately measured), but instead, the firing temperature as estimated by the controller (and related equipment) of the GT 10.

As shown in this example, e.g., in FIG. 5, the center point of line GL is a function of the mean firing temperature (T4) of the set of GTs. The mean combustion temperature (T3.9) is a function of the mean firing temperature, and is greater than the mean firing temperature. Noted herein, as the mean firing temperature increases, so will the mean combustion temperature, meaning that line GL will shift to a greater $MW/NO_x$ value, while remaining orthogonal to line RL, which defines the $MW/NO_x$ characteristic for the mean GT in the set at base load. The two lines labeled BL bound line GL, and define the statistical variation among the set of GTs, to two sigma ($\Sigma$), from the mean line RL. The inventors have discovered through empirical testing that lines BL represent a +/−10 degree span in actual firing temperature (T4) from line RL, as measured along a given line orthogonal to line RL. FIG. 6 shows the graphical depiction of FIG. 5, with the addition of indicators for the Mean T4 (firing temperature) at distinct example $MW/NO_x$ values for a fleet of GTs, along lines orthogonal to RL ($MW/NO_x$ characteristic) and lines BL. Mean T4 (B) and Mean T4 (P) in this example, illustrate example fleets at T4=2,410 degrees F. and T4=2,430 degrees F., respectively. FIG. 6 also illustrates a line PL, which is an example of a single GT along a firing temperature (T4) "sweep" or variation orthogonal with the MW/NOx characteristic line. PL shows how the MW/NOx varies by a changing firing temperature (T4).

FIG. 7 shows a three-dimensional graphical depiction of the process P3 (FIG. 4), namely, adjusting an operating condition of each GT in the set of GTs based upon a difference between the respective measured actual emissions value and a nominal emissions value at the ambient condition. That is, as shown in FIG. 7, the GL plane, defined by the plane of the GL (FIGS. 5-6) across firing temperature (T4) space, illustrates a model of where the set of GTs operate in the firing temperature (T4) space. That is, although actual firing temperature (T4) cannot be directly measured for each GT in the set of GTs, the GL plane represents the most accurate model of the firing temperature of GTs within the set of GTs. According to the various embodiments, process P3 includes adjusting an operating condition of each GT based upon a difference between its respective measured actual emissions value ($NO_x$ value) and a nominal (average) emissions value ($NO_x$ value) for the respective GT. That is, according to various embodiments, an operating condition of each GT is adjusted such that its $MW/NO_x$ value intersects GL in two-dimensional space (FIGS. 5-6), and the GL plane in three-dimensional space (FIG. 7). The intersection of the nominal (P50) MW/NOx lines and the GL plane represents the most accurate model of the desired mean actual firing temperature (P4), and by tuning each GT 10 to approach that GL plane, firing temperature variation is reduced across the fleet, increasing the life of the fleet.

The GL (and the GL plane) is a characteristic of how gas turbines are designed and built, and in $MW/NO_x$ space, its center is at the intersection of P50 MW and P50 $NO_x$ for the particular type of GT 10 in a fleet. The length of GL in two-dimensional space (e.g., the space between BLs, FIGS. 5-6) is defined by the GT-to-GT hardware variation for a given type of GT (e.g., physical variances in the manufacture of two machines to the same specifications). By altering operating conditions of a GT 10 in order to align the $MW/NO_x$ value for that GT 10 with the GL (and GL plane), the variation in the actual firing temperature (T4) is minimized.

It is understood that in a non-degraded set (e.g., fleet), that is, a "new" or otherwise "clean" fleet of GTs, the above-noted processes can tune (reduce) the variation in firing temperature across the GTs in that fleet. That is, the processes described and depicted in conjunction with FIGS. 4-7 can reduce the range of variation in three-dimensional MW-NOx-T4 space across the fleet. The range can effectively be referred to as a three-dimensional box, which has a center and a perimeter. According to various embodiments herein, as a set (e.g., fleet) of GTs degrades (that is, subject to wear-and-tear), this three-dimensional box (in MW-NOx-T4 space) will move within the three-dimensional space, and is likely to expand. Further, because each individual GT is a member of a given set (fleet), the various embodiments can designate any particular GT as a center point of the fleet box (MW-NOx-T4), with a statistical uncertainty assigned to the size (variance) of the box.

Being able to predict where a set of GTs will operate within MW-NOx-T4 space may provide several advantages, e.g., a) the impact on performance and lifespan may become more predictable, with less uncertainty; b) if the operation of a the fleet (and any individual machine) is changed, to, e.g., maintain a "new" MW power output, then the consequences for its lifespan may be more predictable; and c) novel operating schemes become feasible, such as a flat-line MW rating across a GT interval, with a de-rate at the "new" condition, and an over-fire during the latter part of the interval such that MW are constant and lifespan is approximately maintained.

As described herein, a set of parameters (a "box") in MW-NOx-T4 space can be created by: a) commanding each GT in the set of GTs to a base load level, based upon a measured ambient condition for each GT; commanding each GT in the set of GTs to adjust a respective output to match a nominal mega-watt power output value, and subsequently measuring an actual emissions value for each GT; and adjusting an operating condition of each GT in the set of GTs based upon a difference between the respective measured actual emissions value and a nominal emissions value at the ambient condition. This set of parameters minimizes variation in GT operating parameters (e.g., MW output, NOx, and fuel flow) and true (not measurable) firing temperature. In service, the performance of a GT degrades due to long-term degradation (normal wear-and-tear), for reasons such as compressor and turbine clearance changes, changes in chargeable and non-chargeable flows, etc. Generally, long-term degradation is difficult to restore without replacing major GT components. The performance of a GT may also degrade due to what is referred to as "fouling" of the compressor, caused by, e.g., build-up of deposits of material from the compressor inlet air. This "fouling" can sometimes be remediated by washing the compressor, e.g., with water.

As described herein, various approaches include determining how the determined MW-NOx-T4 parameters for a fleet of GTs move over time. That is, a fourth variable (T) is introduced into the approaches described herein. Because degradation is a non-linear quantity (in terms of time), it can be considered in two parts for the purposes of modeling: a) an increasingly non-linear bias, over time; and b) a random variation with an increasing variance (standard deviation), over time. According to various embodiments, the degradation is evaluated for a fleet at specific times, e.g., 6,000 operating hours, 12,000 operating hours, 24,000 operating hours, etc. Evaluating degradation at specific times allows bias (part a) to be treated as a mean shift, along with assigning a random variable (part b) to a plurality (e.g., 5-10) hardware variables.

Returning to the flow diagram of FIG. 4, various additional processes are illustrated. According to various embodiments, process P4, following process P3, can include Process P4 can include a plurality of sub-processes, including Process P4A: selecting a set of degradation variables, with assigned randomly selected degradation values, for evaluating the degradation of the set (fleet) of GTs. After selecting the set of degradation variables, and following process P4A, process P4B can include commanding each GT in the set of GTs to adjust to base load conditions, based upon the adjustment made in process P3. Process P4C (following process P4B) can include calculating the MW-NOx-T4 parameters for each GT in the set of GT, following the adjustment to base load conditions for each GT. Path P3-P4A-P4B-P4C is denoted as a "Process 3 study."

In various embodiments, the flow may bypass Process P3, and this Path P2-P4A-P4B-P4C is denoted as a "Process 2 study." In various additional embodiments the flow may bypass Processes P2 and P3, and this Path P1-P4A-P4B-P4C is denoted as a "Process 1 study." Each of the Process 3 study, the Process 2 study and the Process 1 study can provide MW-NOx-T4 parameters for the fleet of GTs (and each individual GT) caused by degradation.

Figure 8:
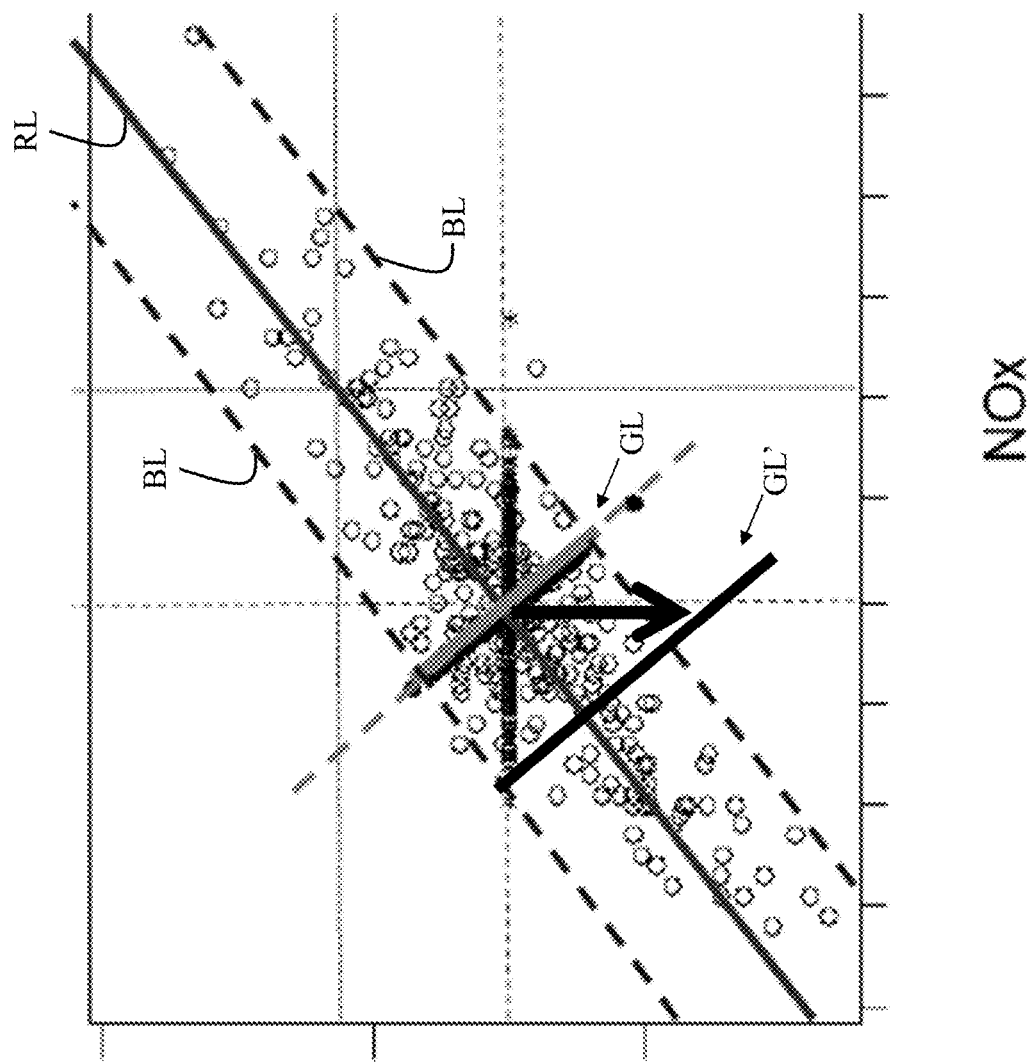
FIG. 8 shows a graphical depiction of a degraded set of GT engines in a Mega-Watt-power v. Emissions ($NO_x$) graph, generated according to a process illustrated in the flow diagram of FIG. 4.

FIG. 8 shows a graphical depiction, via a MW-power v. Emissions ($NO_x$) graph, of degradation of the set of GTs 10, as described in processes P4-P6 with reference to FIG. 4. As shown, (green line) GL is both shifted downward (orthogonally with RL) relative to FIGS. 5-6, but it is also extended in the MW-NOx space relative to its position in FIGS. 5-6 (shown as GL'). That is, as the set of degraded GTs operates at a lower MW-NOx-T4 level than the non-degraded set, but additionally, the MW-NOx-T4 space encompassing the set of GTs is expanded relative to the non-degraded set.

Returning to the flow chart in FIG. 4, process P4 (selecting the set of degradation variables) can include additional sub-processes, such as: selecting a ranked sub-group of variables affecting degradation of a GT from a larger group of variables affecting degradation of the GT. That is, in various embodiments thirty (30) or more variables may affect degradation of a GT. According to various embodiments, the top 5-10 variables may be selected. It is understood that the GT has a mean long term degradation (in MW output), as is known in the art. Additionally, the log-normal type distribution of that mean long-term degradation has a minimum degradation (zero), and a defined maximum degradation, as is known in the art. According to various embodiments, additional processes can include simulating degradation of the selected set of variables for a nominal (P50) GT, and calculating MW output. Additionally, the process can include iteratively adjusting the degradation values for those selected variables until the MW output matches the mean long-term degradation (in MW) at a defined number of operating hours (e.g., 12,000 hours). This process can also be repeated for the maximum degradation at the same defined number of operating hours. The resulting min-mean-max values will allow for estimation of the parameters of log normal-type distributions (e.g., mean and variance) for each of the selected set of degradation variables.

Figure 9:
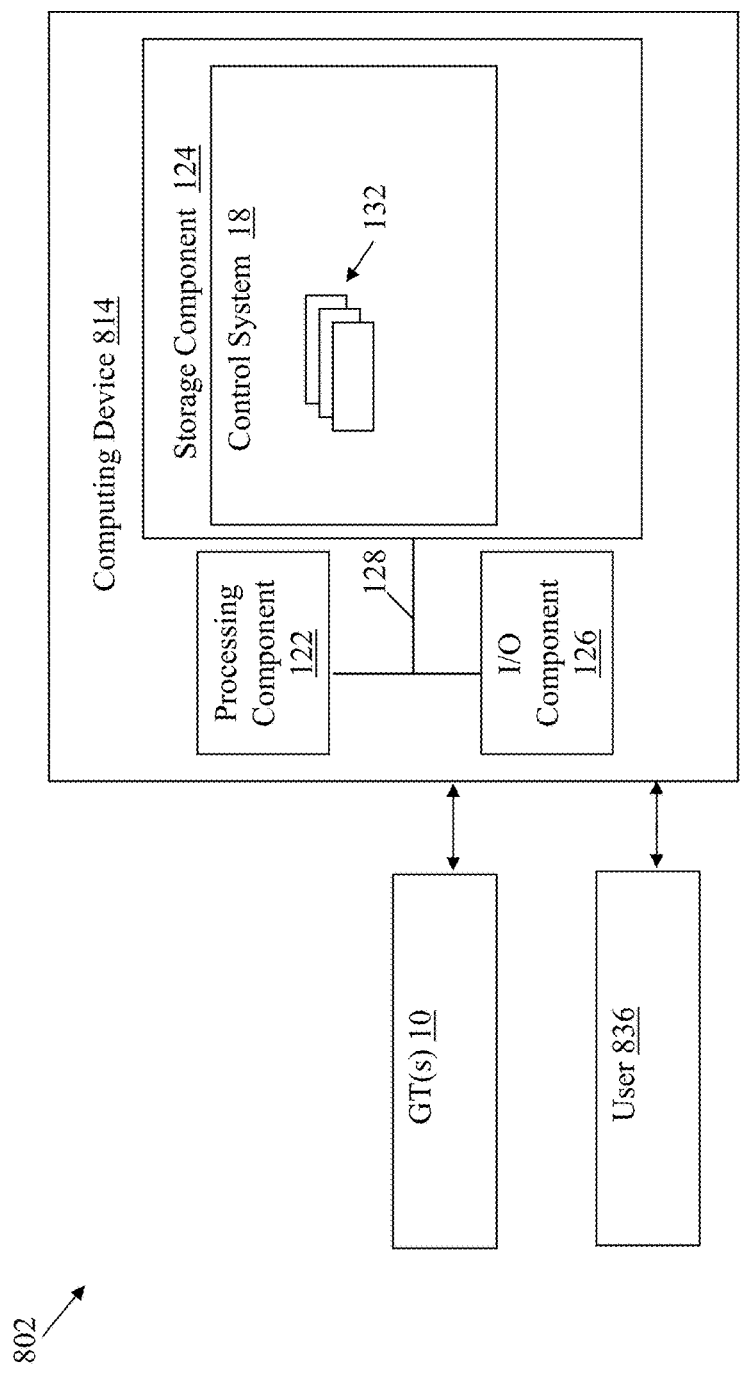
FIG. 9 shows an illustrative environment including a control system according to various embodiments of the invention.

FIG. 9 shows an illustrative environment 802 demonstrating the controller (control system 18) coupled with the GTs 10 via at least one computing device 814. As described herein, the control system 18 can include any conventional control system components used in controlling a gas turbine engine (GT). For example, the control system 18 can include electrical and/or electro-mechanical components for actuating one or more components in the GT(s) 10. The control system 18 can include conventional computerized sub-components such as a processor, memory, input/output, bus, etc. The control system 18 can be configured (e.g., programmed) to perform functions based upon operating conditions from an external source (e.g., at least one computing device 814), and/or may include pre-programmed (encoded) instructions based upon parameters of the GT(s) 10.

The system 8042 can also include at least one computing device 814 connected (e.g., hard-wired and/or wirelessly) with the control system 18 and GT(s) 10. In various embodiments, the computing device 814 is operably connected with the GT(s) 10, e.g., via a plurality of conventional sensors such as flow meters, temperature sensors, etc., as described herein. The computing device 814 can be communicatively connected with the control system 18, e.g., via conventional hard-wired and/or wireless means. The control system 18 is configured to monitor the GT(s) 10 during operation according to various embodiments.

Further, computing device 814 is shown in communication with a user 836. A user 836 may be, for example, a programmer or operator. Interactions between these components and computing device 814 are discussed elsewhere in this application.

As noted herein, one or more of the processes described herein can be performed, e.g., by at least one computing device, such as computing device 814, as described herein. In other cases, one or more of these processes can be performed according to a computer-implemented method. In still other embodiments, one or more of these processes can be performed by executing computer program code (e.g., control system 18) on at least one computing device (e.g., computing device 814), causing the at least one computing device to perform a process, e.g., tuning at least one GT 10 according to approaches described herein.

In further detail, computing device 814 is shown including a processing component 122 (e.g., one or more processors), a storage component 124 (e.g., a storage hierarchy), an input/output (I/O) component 126 (e.g., one or more I/O interfaces and/or devices), and a communications pathway 128. In one embodiment, processing component 122 executes program code, such as control system 18, which is at least partially embodied in storage component 124. While executing program code, processing component 122 can process data, which can result in reading and/or writing the data to/from storage component 124 and/or I/O component 126 for further processing. Pathway 128 provides a communications link between each of the components in computing device 814. I/O component 126 can comprise one or more human I/O devices or storage devices, which enable user 836 to interact with computing device 814 and/or one or more communications devices to enable user 136 and/or CS 138 to communicate with computing device 814 using any type of communications link. To this extent, CC plant load monitoring system 16 can manage a set of interfaces (e.g., graphical user interface(s), application program interface, and/or the like) that enable human and/or system interaction with control system 18.

In any event, computing device 814 can comprise one or more general purpose computing articles of manufacture (e.g., computing devices) capable of executing program code installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, CC plant load monitoring system 16 can be embodied as any combination of system software and/or application software. In any event, the technical effect of computing device 814 is to tune at least one GT 10 according to various embodiments herein.

Further, control system can be implemented using a set of modules 132. In this case, a module 132 can enable computing device 814 to perform a set of tasks used by control system 18, and can be separately developed and/or implemented apart from other portions of control system 18. Control system 18 may include modules 132 which comprise a specific use machine/hardware and/or software. Regardless, it is understood that two or more modules, and/or systems may share some/all of their respective hardware and/or software. Further, it is understood that some of the functionality discussed herein may not be implemented or additional functionality may be included as part of computing device 814.

When computing device 814 comprises multiple computing devices, each computing device may have only a portion of control system 18 embodied thereon (e.g., one or more modules 132). However, it is understood that computing device 814 and control system 18 are only representative of various possible equivalent computer systems that may perform a process described herein. To this extent, in other embodiments, the functionality provided by computing device 814 and control system 18 can be at least partially implemented by one or more computing devices that include any combination of general and/or specific purpose hardware with or without program code. In each embodiment, the hardware and program code, if included, can be created using standard engineering and programming techniques, respectively.

Regardless, when computing device 814 includes multiple computing devices, the computing devices can communicate over any type of communications link. Further, while performing a process described herein, computing device 814 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

As discussed herein, control system 18 enables computing device 814 to control and/or tune at least one GT 10. Control system 18 may include logic for performing one or more actions described herein. In one embodiment, control system 18 may include logic to perform the above-stated functions. Structurally, the logic may take any of a variety of forms such as a field programmable gate array (FPGA), a microprocessor, a digital signal processor, an application specific integrated circuit (ASIC) or any other specific use machine structure capable of carrying out the functions described herein. Logic may take any of a variety of forms, such as software and/or hardware. However, for illustrative purposes, control system 18 and logic included therein will be described herein as a specific use machine. As will be understood from the description, while logic is illustrated as including each of the above-stated functions, not all of the functions are necessary according to the teachings of the invention as recited in the appended claims.

In various embodiments, control system 18 may be configured to monitor operating parameters of one or more GT(s) 10 as described herein. Additionally, control system 18 is configured to command the one or more GT(s) 10 to modify those operating parameters in order to achieve the control and/or tuning functions described herein.

It is understood that in the flow diagram shown and described herein, other processes may be performed while not being shown, and the order of processes can be rearranged according to various embodiments. Additionally, intermediate processes may be performed between one or more described processes. The flow of processes shown and described herein is not to be construed as limiting of the various embodiments.

In any case, the technical effect of the various embodiments of the invention, including, e.g., the control system 18, is to control and/or tune one or more GT(s) 10 as described herein.

In various embodiments, components described as being "coupled" to one another can be joined along one or more interfaces. In some embodiments, these interfaces can include junctions between distinct components, and in other cases, these interfaces can include a solidly and/or integrally formed interconnection. That is, in some cases, components that are "coupled" to one another can be simultaneously formed to define a single continuous member. However, in other embodiments, these coupled components can be formed as separate members and be subsequently joined through known processes (e.g., fastening, ultrasonic welding, bonding).

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A computing system comprising:
   at least one computing device having at least one controller, the at least one computing device configured to tune each gas turbine in a set of a plurality of gas turbines based upon a power output parameter and an emissions parameter, wherein the at least one computing device is configured to:
   command each gas turbine in the set to a respective base load level based upon a respective measured ambient condition;
   command each gas turbine in the set to adjust a respective actual value of the power output parameter of each gas turbine in the set to match a nominal value of the power output parameter of the set, and subsequently measure a respective actual value of the emissions parameter for each gas turbine in the set;
   perform a first adjustment to a respective operating parameter of each gas turbine in the set based upon a difference between the respective actual value of the emissions parameter and a nominal value of the emissions parameter at the respective measured ambient condition for each gas turbine in the set,
   wherein the first adjustment to the respective operating parameter of each gas turbine in the set aligns each gas turbine in the set onto a first line in a graphical space plotting the power output parameter versus the emissions parameter,
   wherein the first line is orthogonal to a characteristic line in the graphical space, wherein the characteristic line is a mean characteristic line of all of the plurality of gas turbines in the set, at the respective base load level of each gas turbine in the set, plotting the power output parameter versus the emissions parameter; and
   calculate a degradation, indicative of a degradation amount over a time period, for each gas turbine in the set.

2. The computing system of claim 1, wherein the respective base load level is associated with a base load value of the power output parameter and a base load value of the emissions parameter for the respective measured ambient condition.

3. The computing system of claim 1, wherein in response to the command of each gas turbine in the set to the respective base load level, each gas turbine in the set does not attain at least one of: the nominal value of the power output parameter of the set and the nominal value of the emissions parameter at the respective measured ambient condition.

4. The computing system of claim 1, wherein the at least one computing device is further configured to convert the difference between the respective actual value of the emissions parameter and the nominal value of the emissions parameter at the respective measured ambient condition for each gas turbine in the set into a difference between a respective value of the power output parameter along the first line and the nominal value of the power output parameter of the set for each gas turbine in the set.

5. The computing system of claim 4, wherein the first adjustment to the respective operating parameter of each gas turbine in the set includes adjusting the respective operating parameter of each gas turbine in the set by a fraction of the difference between the respective value of the power output parameter along the first line and the nominal value of the power output parameter of the set, such that the power output parameter of each gas turbine in the set approaches and then reaches a respective nominal value of the power output parameter along the first line.

6. The computing system of claim 1, wherein, as part of the calculation of the degradation for each gas turbine in the set, the at least one computing device is further configured to:
   select a set of degradation variables and assign each of the degradation variables with a randomly selected degradation value.

7. The computing system of claim 6, wherein the set of the degradation variables includes a ranked sub-group of variables selected from a larger group of variables.

8. A computer program product comprising program code embodied in at least one non-transitory computer readable medium, which when executed by at least one computing device having at least one controller, causes the at least one computing device to tune each gas turbine in a set of a plurality of gas turbines based upon a power output parameter and an emissions parameter by:
   commanding each gas turbine in the set to a respective base load level based upon a respective measured ambient condition;
   commanding each gas turbine in the set to adjust a respective actual value of the power output parameter of each gas turbine in the set to match a nominal value of the power output parameter of the set, and subsequently measuring a respective actual value of the emissions parameter for each gas turbine in the set;
   performing a first adjustment to a respective operating parameter of each gas turbine in the set based upon a difference between the respective actual value of the emissions parameter and a nominal value of the emissions parameter at the respective measured ambient condition for each gas turbine in the set,
   wherein the first adjustment to the respective operating parameter of each gas turbine in the set aligns each gas turbine in the set onto a first line in a graphical space plotting the power output parameter versus the emissions parameter,
   wherein the first line is orthogonal to a characteristic line in the graphical space, wherein the characteristic line is a mean characteristic line of all of the plurality of gas turbines in the set, at the respective base load level of each gas turbine in the set, plotting the power output parameter versus the emissions parameter; and
   calculating a degradation, indicative of a degradation amount over a time period, for each gas turbine in the set.

9. The computer program product of claim 8, wherein the respective base load level is associated with a base load value of the power output parameter and a base load value of the emissions parameter for the respective measured ambient condition.

10. The computer program product of claim 8, wherein in response to the commanding of each gas turbine in the set to the respective base load level, each gas turbine in the set does not attain at least one of: the nominal value of the power output parameter of the set and the nominal value of the emissions parameter at the respective measured ambient condition.

11. The computer program product of claim 8, which when executed, causes the at least one computing device to convert the difference between the respective actual value of the emissions parameter and the nominal value of the emissions parameter at the respective measured ambient condition for each gas turbine in the set into a difference between a respective value of the power output parameter along the first line and the nominal value of the power output parameter of the set for each gas turbine in the set.

12. The computer program product of claim 11, wherein the first adjustment to the respective operating parameter of each gas turbine in the set includes adjusting the respective operating parameter of each gas turbine in the set by a fraction of the difference between the respective value of the power output parameter along the first line and the nominal value of the power output parameter of the set value, such that the power output parameter of each gas turbine in the set approaches and then reaches a respective nominal value of the power output parameter along the first line.

13. The computer program product of claim 8, wherein the calculating of the degradation for each gas turbine in the set includes:
selecting a set of degradation variables and assigning each of the degradation variables with a randomly selected degradation value.

14. The computer program product of claim 13, wherein the selecting of the set of degradation variables includes selecting a ranked sub-group of variables from a larger group of variables.

15. A computer-implemented method of tuning each gas turbine in a set of a plurality of gas turbines based upon a power output parameter and an emissions parameter, performed using at least one computing device having at least one controller, the computer-implemented method comprising:
commanding each gas turbine in the set to a respective base load level based upon a respective measured ambient condition;
commanding each gas turbine in the set to adjust a respective actual value of the power output parameter of each gas turbine in the set to match a nominal value of the power output parameter of the set, and subsequently measuring a respective actual value of the emissions parameter for each gas turbine in the set;
performing a first adjustment to a respective operating parameter of each gas turbine in the set based upon a difference between the respective actual value of the emissions parameter and a nominal value of the emissions parameter at the respective measured ambient condition for each gas turbine in the set,
wherein the first adjustment to the respective operating parameter of each gas turbine in the set aligns each gas turbine in the set onto a first line in a graphical space plotting the power output parameter versus the emissions parameter,
wherein the first line is orthogonal to a characteristic line in the graphical space, wherein the characteristic line is a mean characteristic line of all of the plurality of gas turbines in the set, at the respective base load level of each gas turbine in the set, plotting the power output parameter versus the emissions parameter; and
calculating a degradation, indicative of a degradation amount over a time period, for each gas turbine in the set.

16. The computer-implemented of claim 15, wherein the respective base load level is associated with a base load value of the power output parameter and a base load value of the emissions parameter for the respective measured ambient condition, wherein in response to the commanding of each gas turbine in the set to the respective base load level, each gas turbine in the set does not attain at least one of: the nominal value of the power output parameter and the nominal value of the emissions parameter at the respective measured ambient condition, the computer-implemented method further including converting the difference between the respective actual value of the emissions parameter and the nominal value of the emissions parameter at the respective measured ambient condition for each gas turbine in the set into a difference between a respective value of the power output parameter along the first line and the nominal value of the power output parameter of the set for each gas turbine in the set.

17. The computer-implemented method of claim 16, wherein the first adjustment to the respective operating parameter of each gas turbine in the set includes adjusting the respective operating parameter of each gas turbine in the set by a fraction of the difference between the respective value of the power output parameter along the first line and the nominal value of the power output parameter of the set, such that the power output parameter of each gas turbine in the set approaches and then reaches a respective nominal value of the power output parameter along the first line.

18. The computer-implemented method of claim 15, wherein the commanding of each gas turbine in the set to adjust the respective actual value of the power output parameter of each gas turbine in the set to match the nominal value of the power output parameter of the set moves the emissions parameter for each gas turbine in the set closer to the nominal value of the emissions parameter at the respective measured ambient condition without matching the nominal value of the emissions parameter at the respective measured ambient condition.

19. The computer-implemented method of claim 18, wherein the calculating of the degradation for each gas turbine in the set includes:
selecting a set of degradation variables and assigning each of the degradation variables with a randomly selected degradation value.

20. The computer-implemented method of claim 19, wherein the selecting of the set of the degradation variables includes selecting a ranked sub-group of variables from a larger group of variables.

* * * * *